(12) United States Patent
Shi et al.

(10) Patent No.: US 9,774,694 B2
(45) Date of Patent: Sep. 26, 2017

(54) SERVER-SIDE CONTROL OF CLIENT-SIDE DATA SAMPLING

(71) Applicant: Facebook, Inc., Menlo Park, CA (US)

(72) Inventors: Weizhe Shi, Mountain View, CA (US); Amir Rosenfeld, Sunnyvale, CA (US); Rollin Su, Sunnyvale, CA (US); Lei Lei, Mountain View, CA (US); Yang Gao, Menlo Park, CA (US); Xiao Zhang, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 168 days.

(21) Appl. No.: 14/728,579

(22) Filed: Jun. 2, 2015

(65) Prior Publication Data

US 2016/0359713 A1    Dec. 8, 2016

(51) Int. Cl.
*G06F 15/177* (2006.01)
*H04L 29/08* (2006.01)
*H04L 12/26* (2006.01)
*H04L 12/24* (2006.01)

(52) U.S. Cl.
CPC .......... *H04L 67/22* (2013.01); *H04L 41/0813* (2013.01); *H04L 43/04* (2013.01); *H04L 43/103* (2013.01); *H04L 43/16* (2013.01)

(58) Field of Classification Search
CPC ....... H04L 43/103; H04L 43/16; H04L 43/04; H04L 41/0813
See application file for complete search history.

(56) References Cited

U.S. PATENT DOCUMENTS

| | | | |
|---|---|---|---|
| 8,769,138 B2* | 7/2014 | Bernbo | G06F 17/30206 709/231 |
| 2006/0271592 A1* | 11/2006 | Selkirk | G06F 8/65 |
| 2009/0106008 A1* | 4/2009 | Branson | G06F 9/5066 703/13 |
| 2010/0157837 A1* | 6/2010 | Lv | H04L 43/022 370/252 |
| 2014/0310235 A1* | 10/2014 | Chan | G06F 17/30598 707/603 |
| 2015/0120883 A1* | 4/2015 | Gurtowski | H04L 65/60 709/219 |
| 2015/0281710 A1* | 10/2015 | Sievert | H04N 19/164 375/240.02 |
| 2016/0065655 A1* | 3/2016 | Bentley | H04L 67/10 709/201 |
| 2016/0277490 A1* | 9/2016 | Wexler | H04L 67/1029 |

* cited by examiner

*Primary Examiner* — Richard G Keehn
(74) *Attorney, Agent, or Firm* — Perkins Coie LLP (57) ABSTRACT

The disclosure is related to a framework that enables server-side controlling of data sampling at client devices. An application executing on a client device samples data related to various aspects of the application, generates a log file containing the sample data and transmits the log file to the server. The application samples the data based on specified criteria, e.g., specified events, specified actions of a user of the client device, at a specified sampling rate. The framework enables controlling the sampling of such data from the server. The framework can be used to configure various parameters of the sampling, including a number of users to be sampled, a set of events to be sampled, a sampling rate for the events, etc. After the configuration is determined, the server transmits a configuration file to the client device, which performs the sampling based on the configuration in the configuration file.

17 Claims, 10 Drawing Sheets

FIG. 6 (con't.)

SERVER-SIDE CONTROL OF CLIENT-SIDE DATA SAMPLING

BACKGROUND

In computer programming, application programs are often instrumented to monitor or measure the level of a product's performance, diagnose errors, etc. Application developers can implement instrumentation in the form of code instructions that monitor specific components in a system. Instrumentation can be necessary to review the performance of the application, and often incorporates data logging. Current data-logging techniques can use a logging framework that provides an application program interface (API), which can be used by application developers for logging data in their application. When the application is executed, the log API generates a log file having the logged data. Current data-logging techniques generally instrument the source code and this can have some disadvantages. For example, if the application is deployed into production and if the data to be logged has to be changed, e.g., more data items have to be logged, or a frequency with which the data is to be logged has to be changed, the application has to be recompiled with new logging code and then deployed again. This can be very inefficient and resource intensive.

For example, if the application is developed as a mobile application ("app"), the app with new logging code is "pushed" to user's mobile devices ("client computing devices"), and downloading and installing the app can consume resources, e.g., network bandwidth, processing capacity, time and effort of the user. Further, the problem can be amplified if the data logging is changed frequently, which may be the case in new apps or when new features are added to an app and different data may be needed for monitoring the performance of the app. Some users may not update their apps for prolonged periods, which can cause data collection gaps or even errors. One way to avoid such a problem is to configure the app to log all the data items. However, this is also inefficient as too much logging of data can consume the computing resources of the user's device, which can be a significant problem in mobile devices considering the resources, e.g., battery, memory, are limited. Moreover, users may not appreciate that a portion of their bandwidth is consumed by data that is transmitted to the server.

Some data-logging techniques require an end user to change the settings of an application to log data differently. However, this may not be effective as many end users may not take the interest or time to change the settings for data logging. These factors can create problems in obtaining log data.

DETAILED DESCRIPTION

Disclosed are embodiments for a log framework that enables controlling of data sampling at client computing devices from a server computing device ("server"). An application, e.g., social networking application, executing on a client computing device ("client") can sample data related to various aspects of the application, e.g., events that occur in the application. The events can include user interactions, e.g., viewing a news feed in the social networking application, uploading an image, posting a message, commenting on a post, playing a game, messaging another user. The application can generate a log file containing the sampled data and transmit the sampled data to the server, e.g., on which a server portion of the application is executing.

The log framework can generate a sampling configuration that includes data sampling criteria to be used by the application ("app") executing on the client for sampling the data. The sampling criteria can include a list of events occurring in the app to be sampled, a list of actions of a user of the client, a sampling rate of an event, etc. Using the sampling configuration, the server can control the data sampling performed at the client. The log framework enables controlling the sampling of data from the server, thereby eliminating the need to modify the code of app when the sampling criteria are modified.

After the sampling configuration is generated, the server transmits the sampling configuration file to one or more clients, which perform the sampling based on the sampling configuration. The sampling configuration can be transmitted to all the users, some of the users or a single user of the application. The users can be selected for sampling based on various criteria, e.g., randomly. After the users are determined, the server can transmit the sampling configuration to the client devices of the selected users.

The log framework provides the flexibility to sample different events at different sampling rates, e.g., by assigning weights to the events. Events with similar weights are sampled at similar rates. In some embodiments, the sampling rate of an event can be revised based on the sampled data received for the event. For example, the server can generate a confidence interval from the sampling data received for an event and determine whether to adjust the sampling rate of the event based on the received sampled data. The confidence interval of a particular data item can be used as an input for determining or adjusting the sampling rate of an event associated with the data item.

In some embodiments, events are categorized into multiple hierarchies and their sampling rates are determined based on the hierarchy. For example, a first hierarchy can include events that occur more often than a specified threshold and a second hierarchy can include events that occur less often than the specified threshold. Further, the events in the first hierarchy, that is, events that occur more often than the specified threshold can be sampled at a rate lower than the events in the second hierarchy, that is, events that occur less often than the specified threshold.

In some embodiments, an event can be a composite event, which can be viewed as a collection of related events. That is, when a composite event occurs, the related events can also occur. For example, in a social networking application, sharing of a photo album by a user can be a composite event, which can be a collection of related events such as creating a photo album, uploading pictures to the photo album, tagging users in the pictures, face recognition of the people in the picture, identifying a set of users to share the album with, sharing the album, etc. The events in the composite event can occur independent of the composite event and/or when the composite event occurs. For example, tagging a user in the picture can occur when the user shares the album with other users or also can occur independently, e.g., tagging a person in an image uploaded by another user. In some embodiments, the individual sampling weights of the related events can be different from a sampling weight of the composite event, in which case the sampling weights of the related events can be adjusted so that the related events are sampled when the composite event is sampled.

The log framework can also assign a priority to the events, and can instruct the clients to send the sampled data to the server at based on a priority of the events. For example, the log framework can instruct a client to send the sampled data of a high priority event substantially immediately after the data is logged by the client. A user, e.g., an administrator associated with the application, the server and/or the framework can define what substantially immediately is. In some embodiments, substantially immediately is within a specified duration, e.g., one or more seconds or a few minutes, after the data related to the event is logged. In some embodiments, substantially immediately is as soon as a connectivity is established, e.g., Internet connection, between the client and the server after the data related to the event is logged. In another example, the log framework can instruct a client to send the sampled data of a low priority event at a time that is determined as a function of available computing resources at the client, e.g., memory, battery, processing capacity, bandwidth of connection between the client and the server. For example, the log framework can instruct the client to transmit the sampled data after the sampled data reaches a specified amount, e.g., a few kilobytes, or when the life of a battery of the client is above a specified percentage. By controlling the sampling of data at the clients from the server, the log framework can eliminate the need for changing the code of the app at the client when the sampling criteria is changed or the need for a user of the client to change the log settings when the sampling criteria is to be changed.

Figure 1:
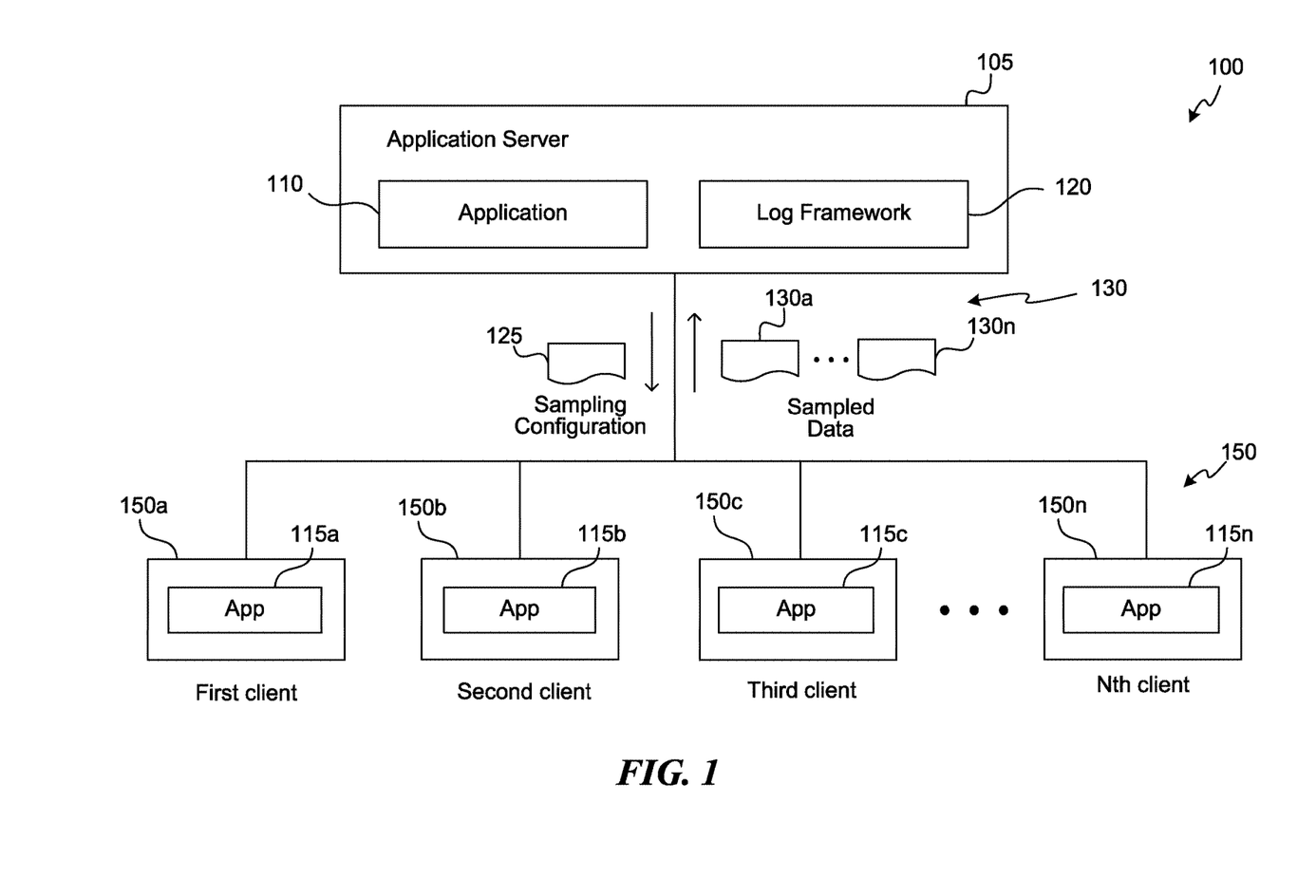
FIG. 1 is a block diagram of an environment in which a log framework can be implemented.

Turning now to the figures, FIG. 1 is a block diagram of an environment in which the log framework can be implemented. The environment 100 includes a server, e.g., server 105, that can be used to implement an application, e.g., a social networking application, which can be accessed by a number of users using associated client computing devices, e.g., clients 150a-n ("clients 150"). The server 105 can execute a server portion of the application, e.g., application 110, and the clients 150 can execute a client portion of the application, e.g., app 115. For example, a first client 150a, which is associated with a first user, can execute the client portion of the application, e.g., app 115a. The first user can download the app 115a, e.g., from a source specified by the server 105, and install the app 115a at the first client 150a.

A client can be a desktop, a laptop, a smartphone, a tablet PC, a wearable device, a computing device integrated within an automobile or any other computing device that is able to execute the app 115. The app 115 can be implemented in various configurations. For example, the app 115 can be a desktop version of a social networking application or a mobile version of the social networking application. In some embodiments, the users can access the desktop version of the social networking application via a web browser.

During the usage of the app 115 by the users, e.g., app 115a by the first user at the first client 150a, various events can occur. In some embodiments, the events can be user interactions or can result from a user interaction. For example, in a social networking application, an event can include loading a news feed, uploading an image, posting a message, commenting on a post, playing a game, messaging another user, sending a friend request, performing a search for other friends, visiting a friend's timeline, etc. The server 105 can collect data associated with such events, e.g., for analyzing the performance of the application 110 and/or app 115, improving the performance of the application 110/app 115, etc. The environment 100 includes a log framework 120 that can facilitate sampling such data at the clients 150. The log framework 120 can be implemented in the server 105 or as a separate server that works in association with the server 105. Additionally or alternatively, the log framework 120 can be implemented as a distributed application over a number of servers.

The log framework 120 facilitates the server 105 to control the sampling of data at the clients based on sampling criteria. For example, the log framework 120 can facilitate the server 105 to control the sampling for "x" number of users. In some embodiments, the number "x" can be determined by the server 105 or input by the administrator. For example, the number "x" can be a specified percentage of total number of users of the app 115. After the number "x" is determined, the server 105 can identify the set of "x" users based on various criteria, e.g., randomly. In another example, the log framework 120 facilitates the server 105 to specify a set of events occurring at a client, e.g., first client 150a, that have to be sampled. In another example, the log framework 120 facilitates the server 105 to specify a sampling rate of an event, that is, a rate at which the events have to be sampled. For example, the sampling rate of an event can be "10%", which can mean that "10" out of "100" occurrences of the event is sampled and data associated with these "10" events is logged, e.g., in a log file.

The log framework 120 generates a sampling configuration file, e.g., sampling configuration 125, that contains the sampling criteria and transmits the sampling configuration 125 to the determined number of users, e.g., all or some of the users. The app 115 at the clients 150 generate samples the data per the sampling configuration 125 and generates sampled data, e.g., sampled data 130. The clients 150 transmit the sampled data 130 to the server 105. In some embodiments, different clients can sample different events. For example, the sampling configuration file sent to the first client 150a can be different from the sampling configuration file sent to the second client 150b. Further, different clients can transmit the sampled data to the server 105 at different times, e.g., based on a priority of the events sampled and/or available computing resources at a specified client.

In some embodiments, the log framework 120 can also facilitate revising the sampling criteria for a user or a set of users based on the received sampled data. For example, if the amount of sampled data received from a specified user for a specified event is insufficient, the sampling rate for the event can be increased. Similarly, if the amount of sampled data exceeds a specified threshold, the sampling rate for the event can be decreased. The sampling rate can be adjusted automatically, e.g., by the server 105, or manually by a user, e.g., an administrator associated with the log framework 120, the server 105 and/or the application 110. After the sampling rate is adjusted, the log framework 120 can generate a revised sampling configuration file and send it to client associated with the specified user. Additional details with respect to generating and transmitting the revised sampling configuration file are described at least in association with FIGS. 6-8.

Figure 2:
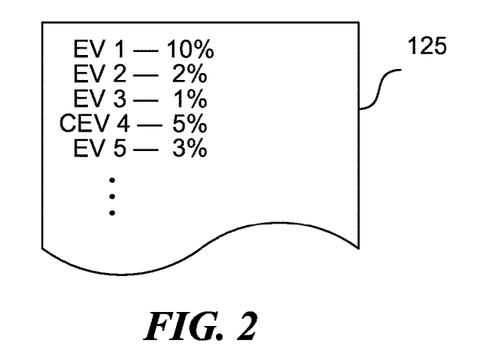
FIG. 2 is a block diagram of an example of sampling configuration file of FIG. 1, consistent with various embodiments.

FIG. 2 is a block diagram of an example of the sampling configuration file of FIG. 1, consistent with various embodiments. The sampling configuration 125 can include various information that may be used by the clients 150 for sampling the data. The sampling configuration 125 can include a list of events, e.g., a first event "EV 1", a second event "EV 2" and so on. The sampling configuration 125 can include the sampling rates of the events. For example, the sampling rate of the first event is "10%," which can mean that "10" out of "100" occurrences of the first event have to be sampled by a client.

Note that FIG. 2 illustrates the sampling configuration 125 as including only the list of events and their sampling rates. However, the information included in the sampling configuration 125 is not limited to the above; the sampling configuration 125 can include other information. In some embodiments, the sampling configuration 125 can include a sampling weight of the event that can be used by the client to determine the sampling rate of the event. The weight can be included in addition to or instead of the sampling rate. The sampling configuration 125 can also include other information, e.g., date and time the sampling configuration 125 was generated at the server 105, a checksum of the sampling configuration 125. It should be noted that the format of the information included in the sampling configuration 125 as illustrated in FIG. 2 is just an example. The sampling configuration 125 can include the information in various other formats based on, e.g., a type of the client device, amount of storage space consumed by the sampling configuration 125, amount of computing resources required to process the sampling configuration 125. In some embodiments, the sampling configuration 125 can be encrypted and/or encoded before being transmitted to the clients 150, which is decrypted and/or decoded by the clients 150 before the data is sampled.

Figure 3:
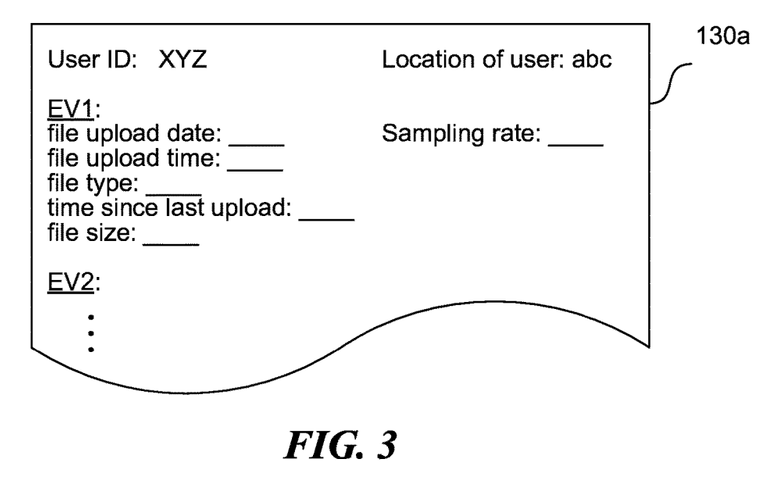
FIG. 3 is a block diagram of an example of sampled data of FIG. 1, consistent with various embodiments.

FIG. 3 is a block diagram of an example of sampled data of FIG. 1, consistent with various embodiments. The sampled data 130 generated by the clients 150 can include various information pertaining to the events occurring at the clients 150. For example, the sampled data 130a, can include information pertaining to the events occurring in the first client 150a associated with the first user. The sampled data 130a includes the data that is sampled as per the latest sampling configuration, e.g., sampling configuration 125, received from the server 105. The sampled data 130a includes other information for each of the events sampled. For example, for an event such as sharing a multimedia item with other users in the social networking application, the information logged/sampled can include an event ID, a file upload date and time, a type of file uploaded (e.g., audio, video, image) a size of the file uploaded, time elapsed since the previous upload, etc.

The sampled data 130a can also include various other information pertaining to the first user and/or the first client 150a, e.g., a user identification (ID) of the first user, a location of the first user, date and time the sampled data 130a was last updated, a type of the first client 150a, a type of connection (e.g., Wi-Fi, cellular internet) used to upload the image.

In some embodiments, the sampled data 130a also includes the sampling rates of the events sampled, which can be provided by the sampling configuration 125. In some embodiments, the sampling rates can be determined using the information, e.g., a weight of an event, provided by the sampling configuration 125. In some embodiments, the sampled data 130a also includes the checksum of the sampling configuration, e.g., sampling configuration 125, according to which the sampled data 130a is generated, which can be used by the log framework 120 to determine if the first client 150a has the latest sampling configuration generated for the first client 150a. The sampled data 130a can be encoded and/or encrypted before being transmitted to the server 105.

It should be noted that the information and the format of the information included in the sampled data 130a as illustrated in FIG. 3 is just an example. The sampled data 130a can include various other information, e.g., as defined by the application 110, and also in various other formats.

Figure 4:
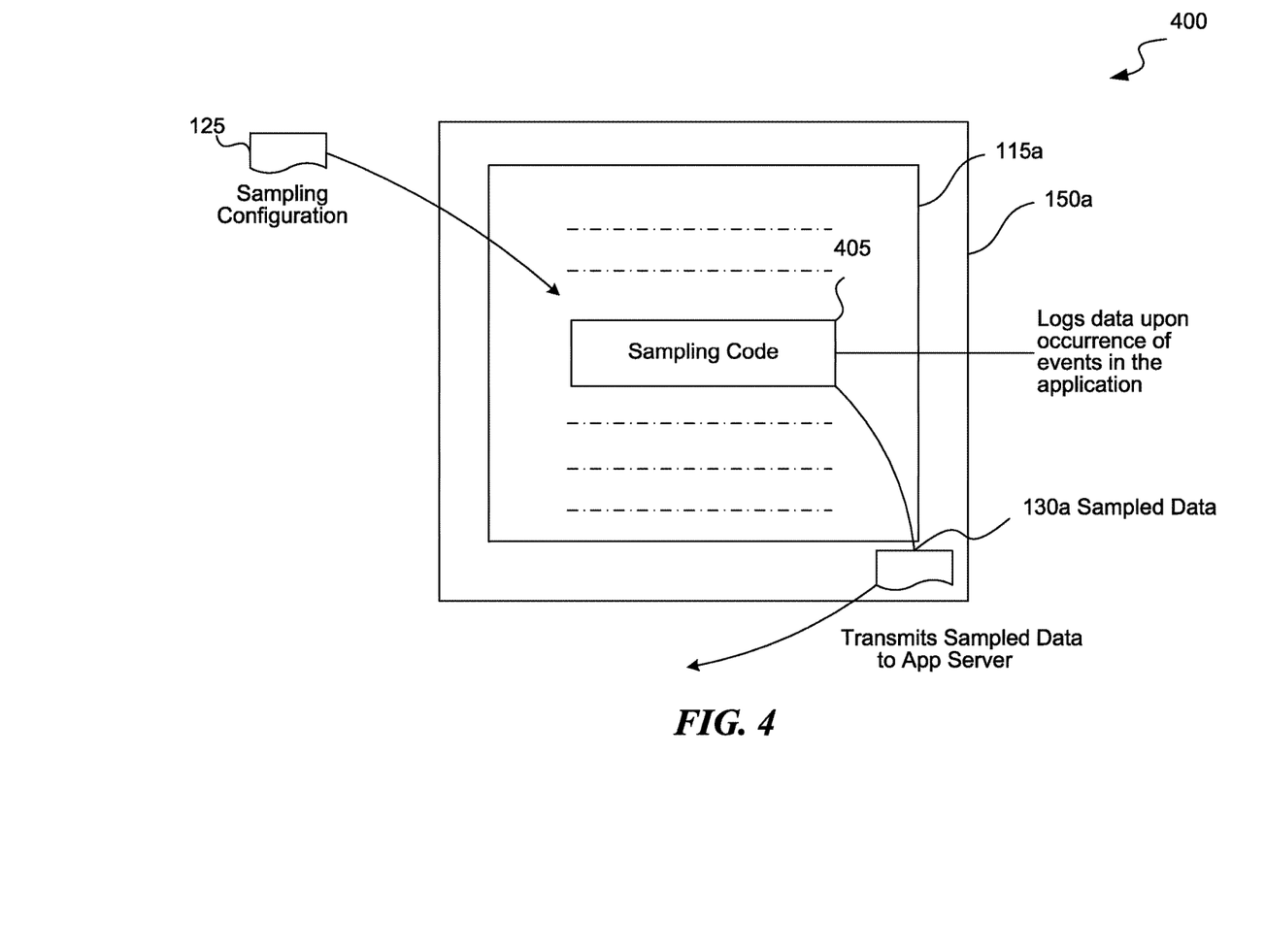
FIG. 4 is a block diagram illustrating an example of sampling of data at a client using the sampling configuration of FIG. 1, consistent with various embodiments.

FIG. 4 is a block diagram illustrating an example 400 of sampling of data at a client using the sampling configuration of FIG. 1, consistent with various embodiments. The example 400 illustrates sampling of data of the first user associated with the first client 150a. When the first client 150a receives a sampling configuration, e.g., sampling configuration 125 from the server 105, the app 115a processes the sampling configuration 125 to sample the data of the first user, e.g., the events occurring on the first client 150a, accordingly. The app 115a includes the code for instrumentation, e.g., sampling code 405. In some embodiments, the sampling code 405 is included as part of the development of the app 115a and is configured to log the necessary data, e.g., as defined by the app 115. The sampling configuration 125 can be used to instruct the sampling code 405 to turn on or turn off the logging of specified data and/or change the sampling rate of the specified data.

The sampling code 405 processes the sampling configuration 125 to determine the events to be sampled and their sampling rates. The sampling code 405 monitors the app 115a for the occurrence of the specified events, samples the events per the sampling configuration 125 and generates the sampled data in a log file, e.g., sampled data 130a. In some embodiments, the sampled data 130a can include the information as illustrated in FIG. 3. The sampled data 130a is then transmitted to the server 105.

The instance at which the sampled data 130a is to be transmitted to the server 105 can be determined based on various factors, e.g., as a function of available computing resources of the first client 150a, a size of the sampled data 130a, priority of the events that are sampled. For example, the log framework 120 can instruct the first client 150a to send the sampled data 130a of a high priority event substantially immediately after the data is logged by the first client 150a, e.g., within a specified duration from the time the data related to the event is logged, as soon as a connectivity between the client and the server is established, e.g., Internet connection, after the data related to the event is logged.

In another example, the log framework 120 can instruct the first client 150a to send the sampled data 130a of a low priority event at a time that is determined as a function of available computing resources at the client, e.g., memory, battery, processing capacity, bandwidth of connection between the client and the server. For example, the log framework 120 can instruct the client to transmit the sampled data after the sampled data reaches a specified amount, or when the life of a battery of the client is above a specified percentage.

Various techniques can be used to minimize the consumption of resources of the first client 150*a* in generating the sampled data 130*a*. For example, the sampled data 130*a* can be encoded to minimize the storage space and bandwidth consumed by the sampled data 130*a*.

Figure 5:
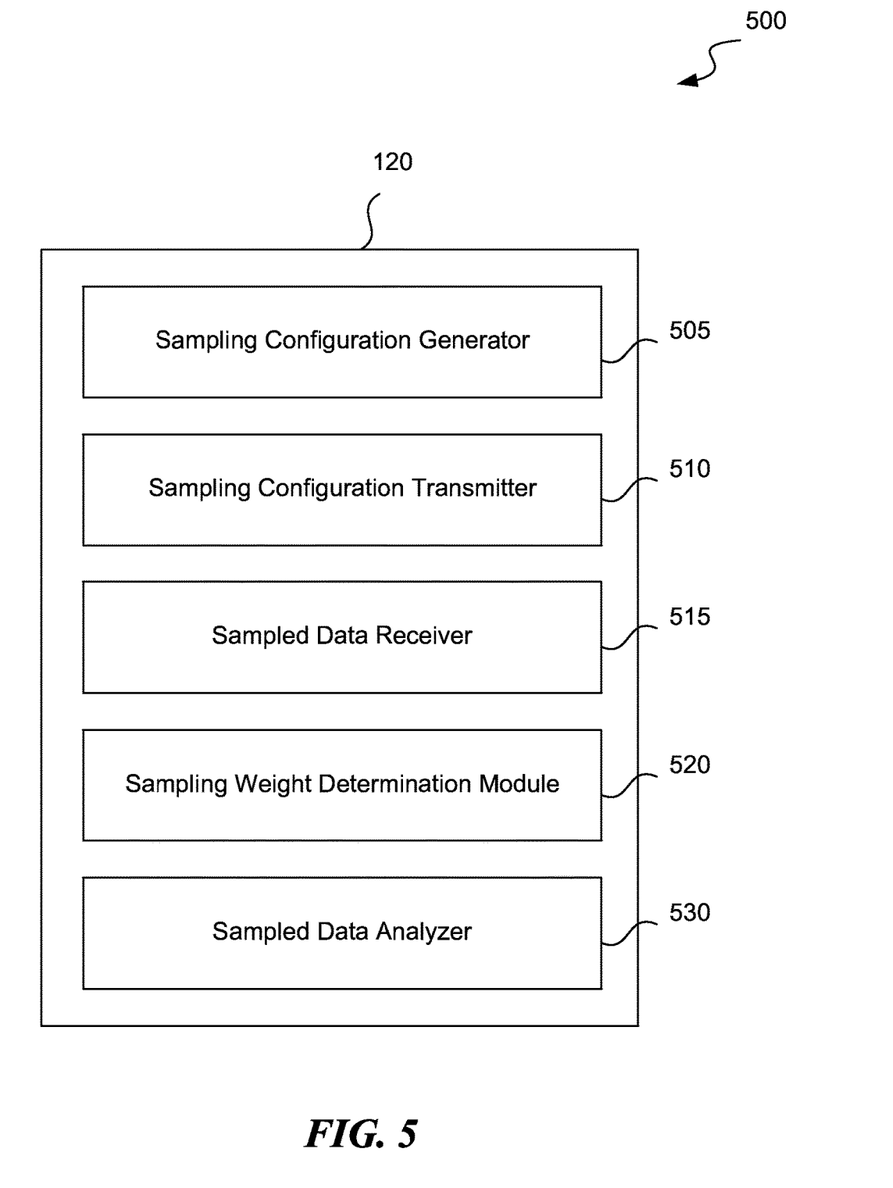
FIG. 5 is a block diagram of the log framework of FIG. 1, consistent with various embodiments.

FIG. 5 is a block diagram of the log framework of FIG. 1, consistent with various embodiments. The log framework 120 includes a sampling configuration generator 505 that can be configured to generate a sampling configuration, e.g., sampling configuration 125, that can be used to control data sampling at clients, e.g., clients 150. The log framework 120 includes a sampling configuration transmitter 510 that can be configured to transmit the sampling configuration generated by the sampling configuration generator 505 to one or more of the clients 150. The sampling configuration transmitter 510 can also be configured to encode and/or encrypt the sampling configuration before being transmitted to the clients 150. In some embodiments, the sampling configuration transmitter 510 can also include the logic to determine the set of users of the application 110 to whom the sampling configuration has to be transmitted. After the set of users are determined, the sampling configuration transmitter 510 transmits the sampling configuration to the clients associated with the set of users.

The log framework 120 includes a sampled data receiver 515 that is configured to receive the sampled data, e.g., sampled data 130, from one or more of the clients 150. The sampled data receiver 515 can also be configured to decode and/or decrypt the sampled data if encoded and/or encrypted by the clients 150. The log framework 120 includes a sampling weight determination module 520 that is configured to assign sampling weights to the events that need to be sampled by the clients 150. In some embodiments, a user, e.g., an administrator associated with the application 110, the log framework 120 and/or the server 105 can program the sampling weight determination module 520 to assign sampling weights to the events. In some embodiments, the sampling weight determination module 520 can automatically adjust the sampling weights as a function of various factors, e.g., sampling weights of other related events.

The log framework 120 includes a sampled data analyzer 530 that can be configured to analyze the sampled data received from the clients 150. For example, the sampled data analyzer 530 can analyze the sampled data to generate a confidence interval for a specified event. The confidence interval can then be used to adjust the sampling rate for the specified event.

Additional details with respect to the modules of the log framework 120 are described at least with reference to FIGS. 6-9 below. Note that the log framework 120 illustrated in FIG. 5 includes five modules. However, the number of modules is not restricted to the above modules. The log framework 120 can include lesser number of modules, e.g., functionalities of two modules can be combined into one module, or can include more number of modules, e.g., modules that perform other functionalities. In some embodiments, the functionalities of one or more of the above modules can be split into two or more modules. Furthermore, the log framework 120 can be implemented in the server 105 or as a separate standalone server that works in co-operation with the server 105.

Figure 6:
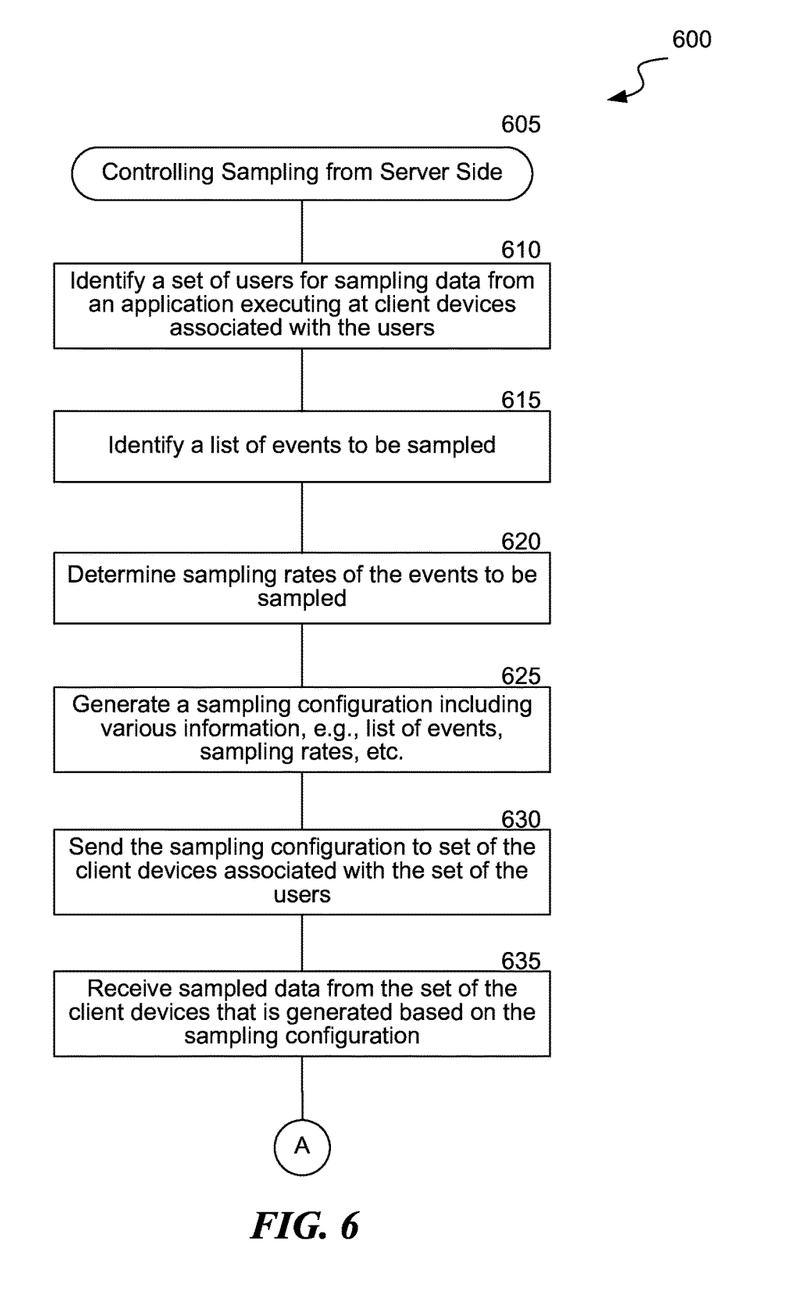
FIG. 6 is a flow diagram of a process of controlling sampling of data at client devices from a server, consistent with various embodiments.

FIG. 6 is a flow diagram of a process 600 of controlling sampling of data at client devices from a server, consistent with various embodiments. The process 600 may be executed in the environment 100 of FIG. 1. The process 600 begins at block 605, and at block 610, the sampling configuration transmitter 510 of log framework 120 identifies a number of users "x" to sample data from.

The sampling configuration transmitter 510 determines the number of users, "x" based on various factors, e.g., total number of users for the application, amount of sampled data requested by the application 110, number of users who can potentially cause the events to occur, actual amount of sampled data received. In some embodiments, the sampling configuration transmitter 510 can receive the number of users from a user, e.g., an administrator associated with the log framework 120, the server 105 and/or the application 110. In some embodiments, the sampling configuration transmitter 510 determines the number of users based on analysis of the previously received sampled data. For example, if the sampled data analyzer 530 determines that the amount of sampled data received exceeds a specified threshold, the sampling configuration transmitter 510 can decrease the number of users from whom the data is to be sampled. After the number of users is determined, the sampling configuration transmitter 510 determines a set of "x" users to whom the sampling configuration is to be transmitted. In some embodiments, the sampling configuration transmitter 510 selects the set of "x" users randomly, pseudo randomly or as specified by the administrator. In some embodiments, pseudo random selection can include selecting subsets of "x" users located at different geographies, of different age profiles, gender profiles, etc.

At block 615, the sampling configuration generator 505 identifies the list of events to be sampled. In some embodiments, the sampling configuration generator 505 can receive the list of events from the administrator.

At block 620, the sampling configuration generator 505 determines the sampling rates of the events to be sampled. The sampling rates can be determined in various ways. In some embodiments, a sampling rate of an event is determined as a function of a weight associated with the event. In some embodiments, the sampling configuration generator 505 can receive the sampling rate from the administrator. In some embodiments, the sampling configuration generator 505 can adjust the sampling rate of the event as a function of a sampling rate of another related event.

At block 625, the sampling configuration generator 505 generates a sampling configuration file, e.g., sampling configuration 125, including various information, e.g., the list of events determined in block 615, sampling rates determined in block 620, etc.

At block 630, the sampling configuration transmitter 510 sends the sampling configuration to a set of the client devices associated with the set of the users, e.g., determined in block 610. In some embodiments, the sampling configuration transmitter 510 can encrypt and/or encode the sampling configuration prior to transmission of the sampling configuration.

At block 635, the sampled data receiver 515 receives the sampled data from the set of the client devices. The clients generate the sampled data based on the sampling configuration transmitted to them, e.g., as described in block 630.

At block 640, the sampling configuration generator 505 can generate a revised sampling configuration to control the sampling of the data at one or more of the client devices, e.g., based on the received sampled data. The sampling configuration can be revised for various reasons, e.g., to adjust number of users, sampling rates of the events, modify the list of events to be sampled. For example, if the amount of sampled data received from the clients exceeds a specified threshold, the number of users who are sampled can be decreased. In another example, if the amount of sampled data for a specified event exceeds a specified threshold, the number of users who are sampled can be decreased. After the revised sampling configuration is generated, it is sent to one or more of the clients. Additional details with respect to sending the revised sampling configuration is described in association with FIG. 7.

Figure 7:
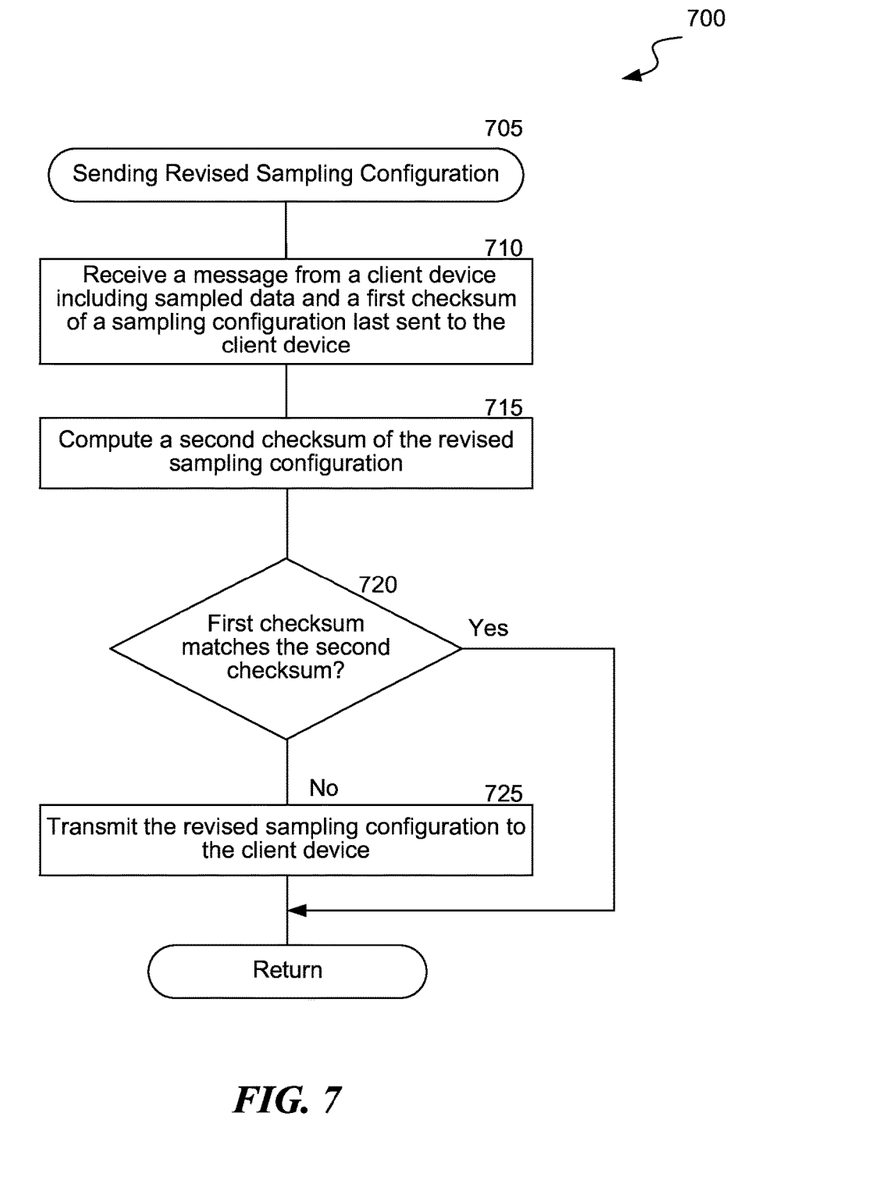
FIG. 7 is a flow diagram of a process of sending a revised sampling configuration to the client devices, consistent with various embodiments.

FIG. 7 is a flow diagram of a process 700 of sending a revised sampling configuration to the client devices, consistent with various embodiments. The process 700 may be executed in in the environment 100 of FIG. 1. The process 700 begins at block 705, and at block 710, the sampled data receiver 515 receives a message from a client device. The message can include the sampled data generated by the client and a checksum of the sampling configuration using which the client generated the sampled data. In some embodiments, a checksum is an error-detection scheme in which each transmitted message is accompanied by a numerical value based on the number of set bits in the message. The receiving station then applies the same formula to the message and checks to make sure the accompanying numerical value is the same. If not, the receiver can assume that the message has been garbled. The checksum can be computed in various known methods.

At block 715, the sampling configuration transmitter 510 computes a checksum of the revised sampling configuration, e.g., generated as described in block 640 of FIG. 6.

At determination block 720, the sampling configuration transmitter 510 determines whether the checksum of the revised sampling configuration matches the checksum in the message received from the client. If the checksums do not match, at block 725, the sampling configuration transmitter 510 transmits the revised sampling configuration to the client. The client will then sample the data based on the revised sampling configuration. On the other hand, if the checksums match, the sampling configuration transmitter 510 may not transmit the revised sampling configuration.

Figure 8:
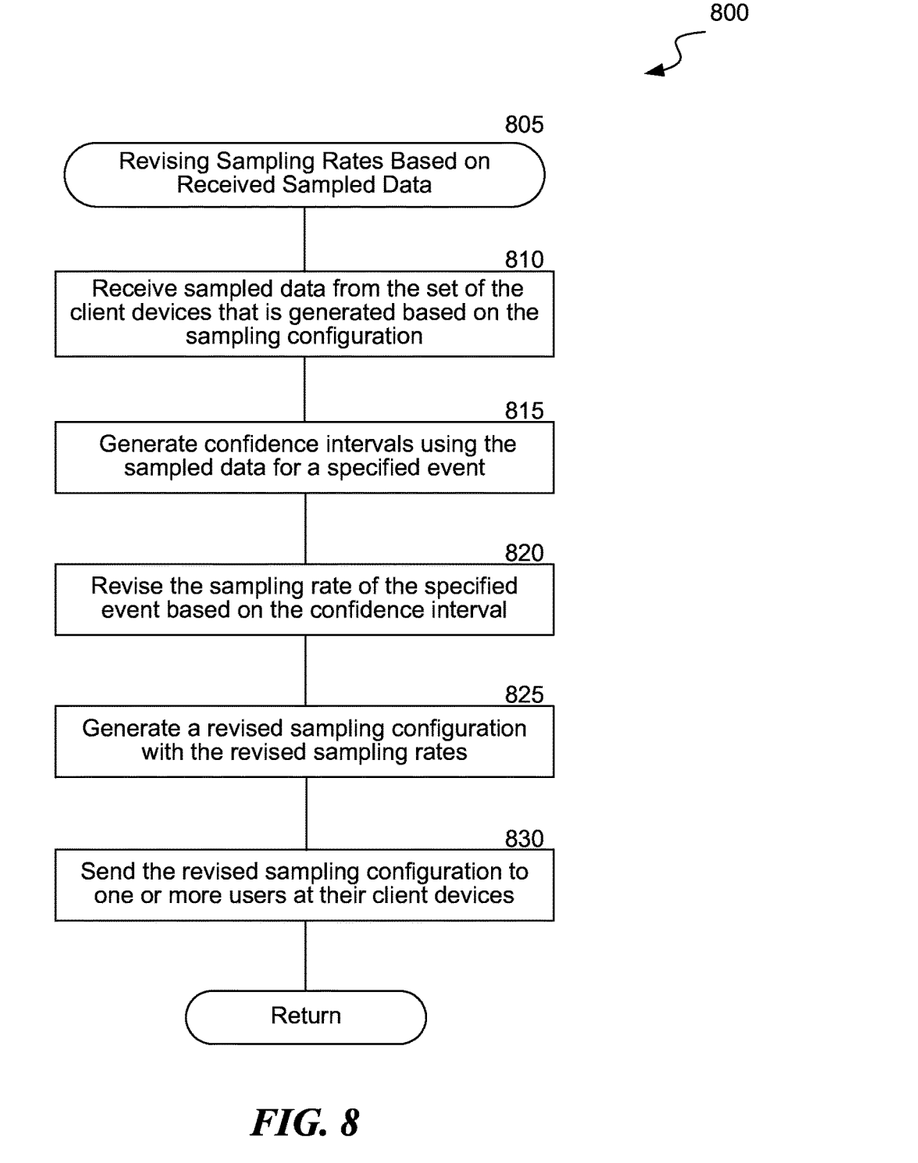
FIG. 8 is a flow diagram of a process of revising sampling rates of events based on sampled data received from client devices, consistent with various embodiments.

FIG. 8 is a flow diagram of a process 800 of revising sampling rates of events based on sampled data received from client devices, consistent with various embodiments. The process 800 may be executed in in the environment 100 of FIG. 1. The sampling rates of the events can be changed manually by a user, e.g., an administrator of the server 105, application 110 and/or the log framework 120. In some embodiments, the sampling rates can be adjusted automatically by the log framework 120. The process 800 begins at block 805, and at block 810, the sampled data receiver 515 receives the sampled data, e.g., sampled data 130, from the clients 150, e.g., that is generated based on the sampling configuration 125 transmitted to the first client 150a as described at least with reference to FIGS. 1 and 6.

At block 815, the sampled data analyzer 530 analyzes the sampled data received from the clients 150 and generates a confidence interval for a specified event using the sampled data. In some embodiments, a confidence interval is a type of interval estimate of a population parameter. It is an observed interval (e.g., calculated from the observations), in principle different from sample to sample, that frequently includes the parameter of interest if the experiment is repeated. How frequently the observed interval contains the parameter is determined by the confidence level or confidence coefficient.

The confidence interval can be input to the sampling configuration generator 505, and at block 820, the sampling configuration generator 505 can revise the sampling rate of the specified event based on the confidence interval. In some embodiments, the administrator can change the sampling rate based on the confidence interval.

At block 825, the sampling configuration generator 505 generates a revised sampling configuration with the revised sampling rate.

At block 830, the sampling configuration transmitter 510 sends the revised sampling configuration to one or more users at their client devices, e.g., as described at least with reference to FIG. 7.

Figure 9:
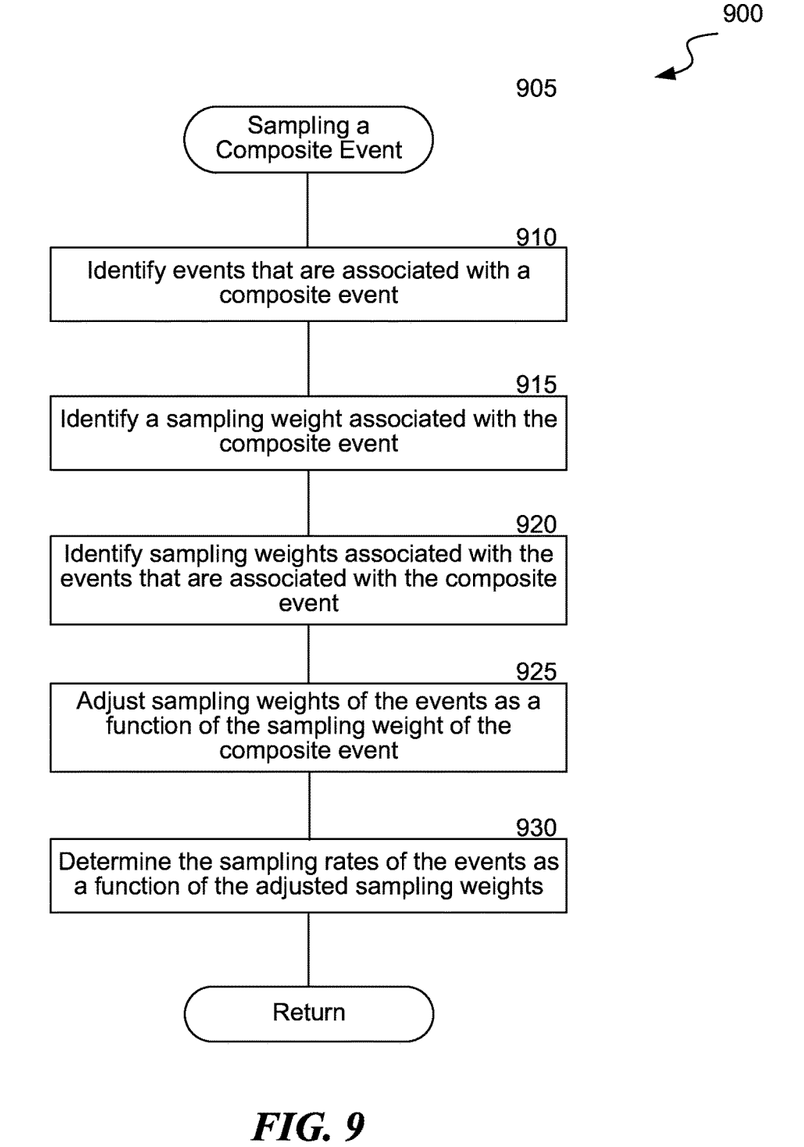
FIG. 9 is a flow diagram of a process of sampling a composite event at client devices of FIG. 1, consistent with various embodiments.

FIG. 9 is a flow diagram of a process 900 of sampling a composite event at client devices of FIG. 1, consistent with various embodiments. The process 900 may be executed in in the environment 100 of FIG. 1. As described above, the sampling rates of different events can be different. Some events can be part of a composite event. A composite event is typically a collection of related events. In some embodiments, when a composite event is sampled, each of the related events that collectively form the composite event is also sampled regardless of the sampling rates of the related events. For example, in a social networking application, sharing of a photo album by a user can be a composite event, which can be a collection of related events such as creating a photo album, uploading pictures to the photo album, tagging users in the pictures, face recognition of the people in the picture, identifying a set of users to share the album with, sharing the album, etc. The following paragraphs describe the generation of a sampling configuration for sampling composite events.

The process 900 begins at block 905, and at block 910, the sampling configuration generator 505 identifies events that are associated with a composite event. In some embodiments, the metadata of events can indicate whether an event is a composite event and also the list of events that are related to the composite event.

At block 915, the sampling weight determination module 520 identifies a sampling weight associated with the composite event. At block 920, the sampling weight determination module 520 identifies sampling weights associated with the events that are associated with the composite event.

At block 925, the sampling weight determination module 520 adjusts the sampling weights of the events as a function of the sampling weight of the composite event such that weights of the associated events are similar to the weight of the composite event.

At block 930, the sampling configuration generator 505 determines the sampling rates of the events as a function of the adjusted sampling weights, and the process returns.

Figure 10:
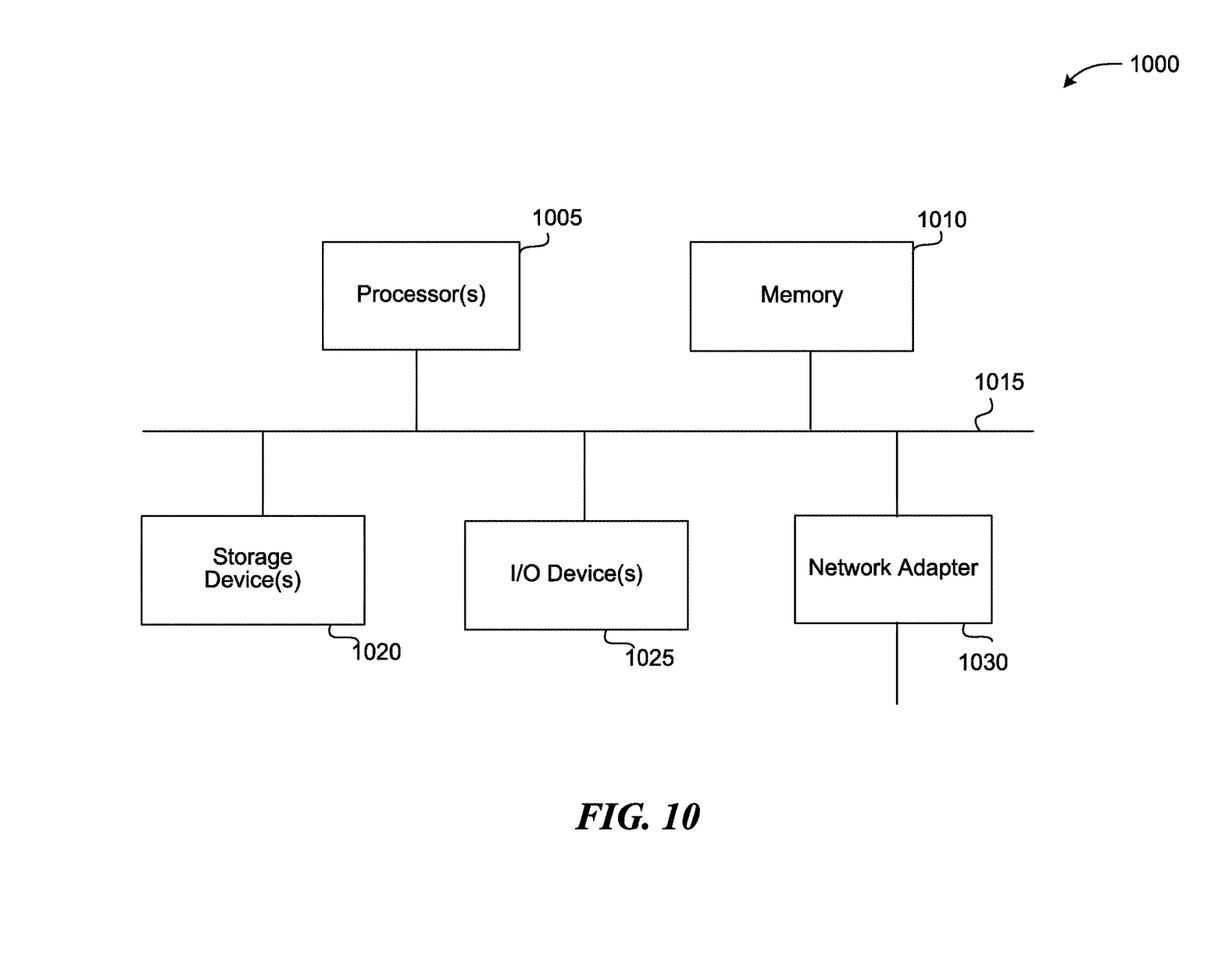
FIG. 10 is a block diagram of a processing system that can implement operations of the present invention.

FIG. 10 is a block diagram of a computer system as may be used to implement features of some embodiments of the disclosed technology. The computing system 1000 may be used to implement any of the entities, components or services depicted in the examples of FIGS. 1-9 (and any other components described in this specification). The computing system 1000 may include one or more central processing units ("processors") 1005, memory 1010, input/output devices 1025 (e.g., keyboard and pointing devices, display devices), storage devices 1020 (e.g., disk drives), and network adapters 1030 (e.g., network interfaces) that are connected to an interconnect 1015. The interconnect 1015 is illustrated as an abstraction that represents any one or more separate physical buses, point to point connections, or both connected by appropriate bridges, adapters, or controllers. The interconnect 1015, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1010 and storage devices 1020 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 1010 can be implemented as software and/or firmware to program the processor(s) 1005 to carry out actions described above. In some embodiments, such software or firmware may be initially provided to the processing system 1000 by downloading it from a remote system through the computing system 1000 (e.g., via network adapter 1030).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:
    determining, at a server in a distributed computing system, a sampling configuration for sampling data from an application executing at multiple client devices associated with multiple users, the determining the sampling configuration including:
        identifying a set of the users to be sampled, and
        determining sampling rates of multiple events to be sampled from the set of users, wherein at least some of the events are associated with sampling weights, wherein the sampling rates are determined based on the sampling weights, wherein the multiple events include a composite event, the composite event being a collection of related events, the composite event associated with a sampling weight;
    sending, from the server, the sampling configuration to a set of the client devices associated with the set of the users;
    receiving, at the server from the set of the client devices, sampled data that is generated based on the sampling configuration; and
    generating, at the server, a revised sampling configuration to control the sampling of the data at one or more of the client devices based on the received sampled data, wherein the generating includes adjusting a sampling rate of a specified event of the multiple events based on the received sampled data of the specified event.

2. The method of claim 1 further comprising:
    transmitting the revised sampling configuration to a specified client device of the client devices associated with a specified user of the users, the transmitting including:

receiving, from the specified client device, a first checksum associated with a first sampling configuration sent to the specified client device prior to sending the revised sampling configuration, confirming that the first checksum is different from a second checksum associated with the revised sampling configuration, and transmitting the revised sampling configuration in response to the confirming.

3. The method of claim 2, wherein receiving the first checksum includes receiving a message from the specified client device, the message including the first checksum and the sampled data.

4. The method of claim 1, wherein generating the revised sampling configuration based on the received sampled data includes:

receiving the sampled data for a specified event of the events from a specified client device of the set of the client devices associated with a specified user of the set of the users, generating a confidence interval for the specified event based on the sampled data, and generating a revised sampling rate for the specified event.

5. The method of claim 1, wherein generating the revised sampling configuration based on the received sampled data includes:

receiving the sampled data for a specified event of the events from the set of the client devices, adjusting a number of the users to be sampled based on the sampled data to generate a second set of the users, and generating the revised sampling configuration to be sent to client devices associated with the second set of the users.

6. The method of claim 1, wherein determining the sampling rates of the events includes:

determining sampling weights associated with the collection of the events in the composite event, adjusting the sampling weights associated with the collection of the events as a function of the sampling weight of the composite event, and generating the sampling rates for the collection of the events based on the adjusted sampling weights of the collection of the events.

7. The method of claim 1, wherein the events are categorized into multiple hierarchies based on a frequency of occurrence of the events.

8. The method of claim 7, wherein the hierarchies include a first hierarchy that has a first set of the events that occurs at a frequency higher than a specified threshold and a second hierarchy that has a second set of the events that occurs at a frequency lower than the specified threshold.

9. The method of claim 8, wherein the sampling rates of the first set of the events whose frequency of occurrence exceeds the specified threshold is lower than the sampling rates of the second set of the events whose frequency of occurrence is below the specified threshold.

10. The method of claim 1, wherein determining the sampling rates of the events includes determining a sampling rate of a first event of the events based on a hierarchy of the first event.

11. A non-transitory computer-readable storage medium storing computer-readable instructions, comprising:

instructions for generating, at a server in a distributed computing system, a sampling configuration that enables multiple client devices associated with multiple users to sample data from an application executing in the client devices, the sampling configuration including a list of events occurring in the application to be sampled and sampling rates of the list of events, wherein at least some events in the list of events are associated with sampling weights, and wherein the sampling rates are determined based on the sampling weights, wherein the list of events includes a composite event, the composite event being a collection of related events, the composite event associated with a sampling weight;

instructions for sending, from the server, the sampling configuration to at least a set of the client devices associated with a set of the users;

instructions for receiving, at the server from the set of the client devices, sampled data that is generated based on the sampling configuration; and instructions for adjusting a sampling rate of a specified event of the list of events based on the received sampled data of at least the specified event.

12. The non-transitory computer-readable storage medium of claim 11 further comprising:

instructions for generating, at the server, a revised sampling configuration to control the sampling of the data at one or more of the client devices.

13. The non-transitory computer-readable storage medium of claim 12, wherein the instructions for generating the revised sampling configuration includes instructions for generating the revised sampling configuration based on the received sampled data.

14. The non-transitory computer-readable storage medium of claim 12, wherein the instructions for generating the revised sampling configuration includes:

instructions for receiving the sampled data for a specified event of the events from a specified client device of the set of the client devices associated with a specified user of the set of the users, instructions for generating a confidence interval for the specified event based on the sampled data, and instructions for generating a revised sampling rate for the specified event.

15. The non-transitory computer-readable storage medium of claim 11, wherein the instructions for receiving sampled data includes:

instructions for commanding a specified client device of the set of client devices to send the sampled data of a first type of the events to the server substantially immediately after the sampled data is generated for the first type of events, and instructions for commanding the specified client device to send the sampled data of a second type of the events to the server at a time that is determined as a function of computing resources of the specified client device.

16. A system, comprising:

a processor;

a sampling configuration generator configured to determine, at a server in a distributed computing system, a sampling configuration for sampling data from an application executing at multiple client devices associated with multiple users, the sampling configuration generator configured to determine the sampling configuration by:

identifying a list of events occurring in the application to be sampled, and determining sampling rates of the list of events, wherein at least some events in the list of events are associated with sampling weights, and wherein the sampling rates are determined based on the sampling weights, wherein the list of events includes a composite event, the composite event being a collection of related events, the composite event associated with a sampling weight;

a sampling configuration transmitter configured to send, from the server, the sampling configuration to a set of the client devices associated with a set of the users; and a sampled data receiver configured to receive, at the server, sampled data from the set of the client devices that is generated based on the sampling configuration, wherein the sampling configuration generator is further configured to:

adjust a sampling rate of a specified event of the list of events at one or more of the client devices based on the received sampled data of at least the specified event.

17. The system of claim 16, wherein the collection of related events are sampled when the composite event is sampled independent of individual sampling rates of events in the collection, and wherein the sampling weights of the collection of events are adjusted as a function of a sampling weight of the composite event to sample the collection of events when the composite event is sampled.

\* \* \* \* \*